United States Patent [19]

Hoyer et al.

[11] 4,315,865

[45] Feb. 16, 1982

[54] PROCESS FOR THE PRODUCTION OF SULFURIC ACID SEMIESTER COMPOUNDS BY SULFATION IN A MACHINE EMPLOYING KNEADING ACTION

[75] Inventors: Ernst Hoyer, Frankfurt am Main; Hans H. Steuernagel; Dieter Wagner, both of Kelkheim, all of Fed. Rep. of Germany

[73] Assignee: Hoechst Aktiengesellschaft, Frankfurt am Main, Fed. Rep. of Germany

[21] Appl. No.: 911,136

[22] Filed: May 31, 1978

Related U.S. Application Data

[63] Continuation of Ser. No. 820,851, Aug. 1, 1977, abandoned.

[30] Foreign Application Priority Data

Aug. 3, 1976 [DE]  Fed. Rep. of Germany ....... 2634855
Aug. 3, 1976 [DE]  Fed. Rep. of Germany ....... 2634909

[51] Int. Cl.$^3$ .................... C09B 1/30; C09B 43/24; C09B 45/00; C09B 57/14
[52] U.S. Cl. .................. 260/373; 260/458 R; 260/459 R; 260/147; 260/148; 260/149; 260/150; 260/151; 260/158; 260/160; 260/161; 260/162; 260/163; 260/176; 260/184; 260/193; 260/194; 260/196; 260/197; 260/198; 260/199; 260/200; 260/201; 260/205; 260/206; 260/207; 260/207.1; 260/207.5; 260/208; 260/314.5; 260/335; 260/459; 260/336; 260/372; 260/374

[58] Field of Search ............. 260/458, 459, 160, 163, 260/161, 162, 199, 198, 208, 374, 373, 704, 372, 148, 206, 197, 205, 207, 207.5, 193, 314.5, 158, 201, 151, 196, 200, 194, 147, 149, 150, 335, 336, 176, 184, 193, 148

[56] References Cited

U.S. PATENT DOCUMENTS

| | | | |
|---|---|---|---|
| 2,134,521 | 10/1938 | Knight | 260/186 |
| 2,755,195 | 7/1956 | Grubenmann | 260/152 |
| 2,784,204 | 3/1957 | Heyna et al. | 260/163 X |
| 2,912,428 | 11/1959 | Gaertner et al. | 106/309 |
| 3,177,190 | 4/1965 | Lange et al. | 260/162 |
| 3,483,182 | 12/1969 | Sugiyama et al. | 260/163 |
| 3,531,459 | 9/1970 | Chiddix et al. | 260/163 |
| 3,647,827 | 3/1972 | Sugiyama et al. | 260/372 |

*Primary Examiner*—Floyd D. Higel
*Attorney, Agent, or Firm*—Curtis, Morris & Safford

[57] ABSTRACT

Improved process for the sulfatation of the hydroxy group of a β-hydroxy-ethylsulfonyl group present in compounds selected from the dyestuff class which comprises carrying out the reaction in a machine operating with a kneading action and effect and with the use of only 1 to 5 times the equimolar amount of a concentrated sulfuric acid, of oleum or sulfur dioxide itself. The β-sulfatoethylsulfonyl group containing dyestuffs, thus prepared have a high purity and are obtained in a high yield and esterification rate. Above all, the novel process is distinguished by a highly reduced salt and acid content of the waste water.

7 Claims, No Drawings

PROCESS FOR THE PRODUCTION OF SULFURIC ACID SEMIESTER COMPOUNDS BY SULFATION IN A MACHINE EMPLOYING KNEADING ACTION

This is a continuation of application Ser. No. 820,851, filed Aug. 1, 1977, now abandoned.

The invention relates to an improved process for the production of sulfuric acid semiester compounds of the formula (II)

$$F \text{---} (SO_2 \text{---} CH_2 \text{---} CH_2 \text{---} OSO_3H)_n \qquad (II)$$

in which F represents a radical of an organic dyestuff molecule and n represents the number 1, 2, 3 or 4, from compounds of the formula (I)

$$F \text{---} (SO_2 \text{---} CH_2 \text{---} CH_2 \text{---} OH)_n \qquad (I)$$

in which F and n have the above meanings, by means of sulfuric acid and/or sulfurtrioxide.

The conversion of compounds of the formula (I) into compounds of the formula (II) is known per se. The esterification of a compound of the formula (I) is effected, for example, in accordance with German Patent No. 960 534, page 5, Example 6, or in accordance with German Patent No. 1 154 892, Example 1, German Patent No. 938 144, Examples 1 to 3 or German Patent No. 1 179 317, Examples 4 and 5 or German Patent No. 1 215 282, Example 3, or German Patent No. 1 276 842, Example 2, or German Offlegungsschrift No. 1 544 538, Example 9, or German Auslegeschrift No. 1 644 663, Example 1 by means of a very high excess of sulfuric acid, that is with 22 to 150 times the molar quantity of 92 to 96% strength by weight sulfuric acid. These high excesses of sulfuric acid must, however, be diluted very much with water for working up the esterification product of the formula (II), so that recovery of the sulfuric acid is practically impossible. The dilute acids, however, as such or in neutralised form as soluble sulfates, contaminate sewage.

It is also possible to precipitate the excess sulfuric acid as calcium sulfate by the addition of, for example, calcium carbonate, to isolate the calcium sulfate by filtration and to work up the filtrate to obtain the dyestuff. In this method of working up, the problem arises of removing the quantities of moist gypsum produced which in the form of a slurry-like filter cake are not suitable for further work-up, for example, to form building materials, and must be placed on special dumps.

Furthermore it is known, for example, from the German Patent Nos. 1 268 756, 1 268 759, 1 544 482, 1 248 188 and 1 283 416 that compounds of the formula (I) can be converted, with a multiple molar amount of amidosulfonic acid in pyridine, into the sulfuric acid semi-esters thereof of the formula (II), but, as is clear from the Examples, all of the pyridine used or a large proportion of it passes into the mother liquors from which it must be removed in some manner before these waste liquors can be allowed into the sewage system. In some of the Examples, after the reaction pyridine is recovered by distillation. On closer observation, however, it is clear that the pyridine recovered is not the total amount introduced. A relatively large proportion passes into the sewage even with this type of work-up.

For these reasons, there has been a pressing need for an esterification process which avoids these disadvantages and causes practically no, or substantially reduced, pollution of the environment, which has now been found.

An improved process for the esterification of the above-mentioned compounds of the formula (I) to give the sulfuric acid semi-esters thereof of the formula (II) by means of sulfuric acid has now been found which comprises carrying out the reaction of the compound of the formula (I) with 1 to 5 times the equimolar amount, calculated on mole of $SO_3$, of 92 to 100% strength sulfuric acid or sulfur trioxide, preferably sulfuric acid containing up to approximately 70, especially 15 to 65% by weight of sulfur trioxide, or of sulfur trioxide itself, in a machine operating with a kneading action and kneading effect.

There are to be understood hereinafter by machines having a kneading action and effect (subsequently commonly called kneaders), machines which are suitable for mixing, dispersing or homogenising, and which can process together liquid and solid components under high forces. The processing (kneading) is usually carried out under high pressure with the moving parts of the machine, such as rolls, discs, rollers, tightly engaging gears and worms, running in the same or opposite directions, preferably at different speeds, which mix components together under high pressure, optionally with the application of shearing forces. Examples of such kneaders are apart from actual kneaders and extruders, saw tooth agitators (dissolvers), rotor-stator mills, dispersing machines (dispergators) and roller mills. These machines may operate continuously or discontinuously; a large number of them in commerical form are known. Discontinuously operating kneaders are, for example, double-troughed kneaders, such as sigma paddle kneaders, dispersing kneaders, Banbury dispersing mixers, continuously operating kneaders, for example, kneading extruders and continuous single-shaft and multi-shaft kneaders (see in this connection also Ullmanns Encyclopeädie der Technischen Chemie, Vol. 1 (1951) pages 725-727; Ullmanns Encyclopädie der Technischen Chemie, 4th Edition Vol. 2 (1972), pages 23 and 292-299).

The radicals F in the formulae (I) and (II) are dyestuff radicals of a wide variety of dyestuff classes, which may be used for dyeing and printing textile materials. These radicals F are in particular dyestuff radicals of azo dyestuffs, for example, of mono-, bis-, tris- or polyazo dyestuffs, of anthraquinone dyestuffs, phthalocyanine dyestuffs, formazane dyestuffs, nitro-, stilbene-, oxazine-, dioxazine-, benzoxanthene-, benzothioxanthene-, phenazine- and xanthene-dyestuffs, of indigoid dyestuffs and of aminoquinone dyestuffs. Among the known and customary substituents these dyestuffs may contain, there are also water-solubilizing groups such as sulfonic acid and carboxylic acid groups.

Preferably F represents a radical of a sulfo group-containing anthraquinone dyestuff, a sulfo group-containing or sulfo group-free monoazodyestuff, a sulfo group-containing or sulfo group-free copper or nickel phthalocyanine dyestuff, a sulfo group-containing monoazo copper complex dyestuff, a sulfo group-containing xanthenium dyestuff, a sulfo group-containing nitro dyestuff, a sulfo group-containing or sulfo group-free copper complex formazane dyestuff, a sulfo group-containing disazo dyestuff or a sulfo group-containing disazo copper complex dyestuff.

The present invention relates in particular to a process for the preparation of anthraquinone sulfuric acid semi-ester compounds of the general formula (IIa) from anthraquinone compounds containing β-hydroxyethylsulfonyl groups of the general formula (Ia) or from the alkali metal or alkaline earth metal salts thereof in the manner according to the invention described above.

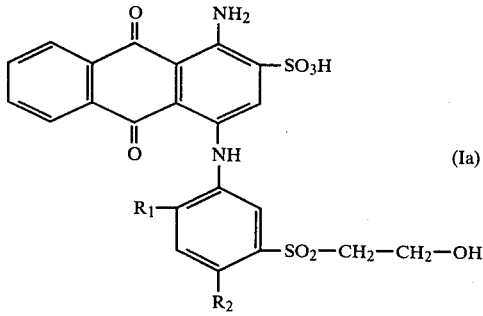
(Ia)

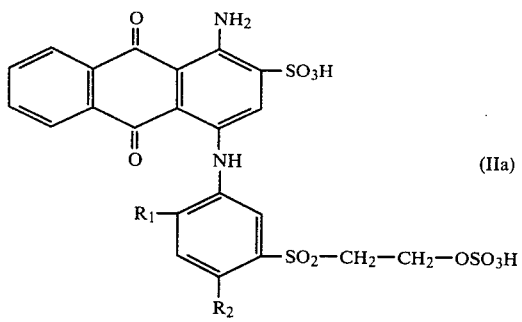
(IIa)

In the formulae (Ia) and (IIa), $R_1$ represents a hydrogen atom, a lower alkoxy group, preferably a methoxy or ethoxy group, especially the methoxy group, or a carboxy group, $R_2$ represents a hydrogen atom or a lower alkoxy group, preferably a methoxy or ethoxy group, preferably the methoxy group, wherein at least one of the two substituents $R_1$ and $R_2$ represents a hydrogen atom.

The sulfuric acid used in the reaction is preferably used in the form of a concentrated sulfuric acid (96% strength), in the form of a so-called monohydrate (100% strength sulfuric acid) or in the form of oleum with an additional content of sulfur trioxide of up to approximately 65% by weight. Preferably there is used as the esterifying agent, inclusive of sulfur trioxide itself, 1.1 to 4 times, especially 1.1 to 2.5 times and more particularly 1.3 to 2.5 times the equimolar amount, calculated on one mole of $SO_3$ and free acids of the formula (I).

The use of a 96–100% strength sulfuric acid and of oleum having an $SO_3$ content of up to 70% by weight is preferred.

The starting compound of the formula (I) may be used either in the form of the free sulfonic acid or in the form of an alkali metal or alkaline earth metal salt. When using a salt, correspondingly more sulfuric acid is needed to convert the compound into the acid form than if the free acid of the formula (I) is used.

The process is carried out in a simple manner either by placing or introducing one of the reactants into the kneader and gradually adding the second component or by introducing the components into the kneader simultaneously or in the form of a mixture.

The reaction temperature may be between +10° C. and 200° C.; advantageously the reaction with the sulfuric acid or oleum or sulfur trioxide is carried out in kneaders (machines with kneading action) at a temperature of 10° to 170° C., especially 80° to 120° C. The treatment time of the reaction mixture in the kneader can be a few minutes to several hours, depending on the temperature and the kneading intensity. Advantageously, at a temperature of between 80° to 120° C. the reaction and kneading time is between 2 minutes and 2 hours depending on the kneading intensity used, which in turn can depend on the type of machine used.

To improve the kneading action and effect or the heat transfer in the kneading mixture during the kneading operation, it is also possible to incorporate an inert addition agent, such as o-dichloro-benzene, kieselguhr, talcum or a metal powder, which can be removed again from the sulfuric acid semi-ester of the formula (II) when working-up the kneaded material.

The work-up of the reaction product after esterification in the kneader is carried out in a manner that is current and customary to one skilled in the art. Advantageously it is effected by dissolving the reaction product in water with simultaneous neutralization of the solution. The neutralization is preferably carried out with sodium bicarbonate or sodium carbonate. The neutral or very weakly acidic dyestuff solution is then, where applicable after separating off the above-mentioned inert addition substances, for example by filtering or centrifuging, evaporated to dryness or spray-dried. In this manner, for example with neutralization with the above-mentioned sodium salts, the compound of the formula (II) is obtained in the form of its (di) sodium salt. Correspondingly it is possible to use potassium bicarbonate or potassium carbonate for neutralisation. Another possibility of working up the kneaded material is to neutralise it with calcium carbonate after dissolving in water, filter off with suction the precipitated calcium sulfate, and to add sodium oxalate or oxalic acid and sodium carbonate or bicarbonate to the filtrate, separate the solution in the usual manner from the precipitate formed, for example by filtering or centrifuging, and then to spray dry.

The compounds of the formula (II) may be produced in the manner according to the invention described above with a degree of esterification of 95–100%. In addition to the advantages already mentioned of using smaller excesses of sulfuric acid with the consequent substantially reduced pollution of sewage and the environment, the compounds of the formula (II) obtained are, in addition, surprisingly of higher quality than those obtained according to the known processes. The compounds of the formula (II), which are valuable as dyestuffs, are superior to the products obtained according to known processes with regard to the degree of esterification, their solubility in water and the purity of the nuance of the dyeings and prints produced with the esterified dyestuffs on cellulose fiber material.

The following Examples serve to illustrate the process of the invention. The parts by weight to parts by volume given therein are as kilogram to liter.

EXAMPLE 1

3.281 parts by weight of the sodium salt (=92% strength by weight, i.e. containing 92% by weight of the pure sodium salt and 8% by weight of an electrolyte) of 4-(3'-β-hydroxy-ethylsulfonylphenylamino)-1-aminoanthraquinone-2-sulfonic acid were introduced into a customary commercial dispersing kneader (for example of the firm Werner & Pfleiderer, Stuttgart-Feuerbach) whilst the machine was running. Then, 1.042 parts by volume of 100% strength sulfuric acid were introduced in the course of 2 minutes. The composition, initially moist, assumed a viscous consistency during the kneading operation, in the course of which the temperature increased to approximately 100° C. within 25 minutes. 40 minutes after the addition of the sulfuric acid the kneaded material, which had a temperature of 100°-105° C., was removed from the kneader.

0.2 parts by weight of the kneaded material were stirred into a mixture of 0.6 parts by volume of water and 0.2 parts by weight of ice, at a temperature of 0°-5° C., with the simultaneous portionwise addition of 0.109 parts by weight of sodium bicarbonate. The pH value of the dyestuff solution thus obtained was 4.0 to 4.5; the solution was clarified and evaporated to dryness in vacuo at 60°-65° C. By grinding, 0.222 part by weight of a dark blue dyestuff powder, which was 64% by weight of dyestuff of the formula (A)

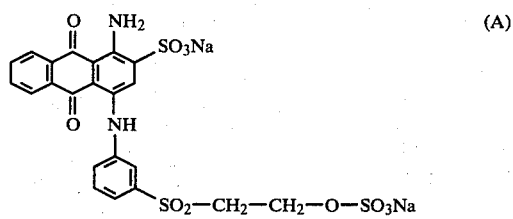

of a molecular weight of 626, was obtained.

EXAMPLE 2

3.138 parts by weight of the sodium salt (92% strength) of 4-(3'-β-hydroxyethylsulfonylphenylamino)-1-aminoanthraquinone-2-sulfonic acid were placed, at room temperature, in a customary commercial Banbury dispersion mixer (for example of the firm Werner & Pfleiderer, Stuttgart-Feuerbach), of which one kneading arm operated at a speed of 29 revs/min and the other at 21 revs/min. During the course of 5 minutes 1.617 parts by weight of 100% strength sulfuric acid were introduced and the reaction mixture was kneaded for 25 minutes with a hydraulically depressed plunger. The kneaded material reached a temperature of 125° C.

0.2 part by weight of the kneaded material were introduced at 0°-5° C. into a mixture of 0.6 parts by volume of water and 0.2 parts by weight of ice; the pH value was adjusted to 4.0 to 4.5 by adding 0.06 parts by weight of calcium carbonate. The mixture was heated to 70°-75° C. by introducing steam, then the resulting calcium sulfate was filtered off and washed several times with hot water; the filtrate and the washing water were cooled to approximately 30° C. At this temperature 0.012 parts by weight of oxalic acid were added; the pH value was adjusted to 4.0 to 4.5 by adding approximately 0.016 parts by weight of sodium bicarbonate. The mixture was stirred at 25°-27° C. for approximately 30-60 minutes, the resulting precipitate was filtered off and the filtrate was spray-dried. 0.16 parts by weight of a dyestuff powder, which was 90% by weight of the dyestuff of the formula (A), were obtained.

EXAMPLE 3

In a dispersion kneader, the kneading arms of which operated at a speed of 22 and 16 revs/min respectively, 2.932 parts by weight of the sodium salt (92% strength) of 4-(3'-β-hydroxyethylsulfonylphenylamino)-1-aminoanthraquinone-2-sulfonic acid were kneaded for 1 hour with 2.11 parts by weight of 100% strength sulfuric acid, the temperature gradually being increased to 95°-100° C. by moderate heating of the jacket. After emptying the kneader, 0.2 parts by weight of the kneaded material were worked up and spray-dried as described in Example 2. 0.136 parts by weight of a dyestuff powder, which was 92% by weight of the dyestuff of the formula (A), were obtained.

By proceeding analogously to the manner described in Examples 1-3, the compounds mentioned in the following Table can be converted correspondingly into their sulfuric acid semi-esters.

| Example | Formula of the compounds used |
|---------|-------------------------------|
| 4 | ![structure] O NH₂ / SO₃Na / O NH / HOOC- / SO₂—CH₂—CH₂—OH |
| 5 | ![structure] O NH₂ / SO₃Na / O NH / CH₃O- / SO₂—CH₂—CH₂—OH |
| 6 | ![structure] O NH₂ / SO₃Na / O NH / SO₂—CH₂—CH₂—OH / OCH₃ |

EXAMPLE 7

1.2 parts by weight of kieselguhr were placed in a customary commercial Banbury dispersion kneader, of which one kneading arm operated at 31 revs/min and the other at 22 revs/min, and 2.25 parts by weight of 100% strength sulfuric acid were introduced in the course of a few minutes. Subsequently, 3.2 parts by weight of the sodium salt (90% strength) of 4-(3'-βhydroxyethylsulfonylphenylamino)-1-aminoanthraquinone-2-sulfonic acid were quickly introduced. Kneading was carried out for 100 minutes with a hydraulically depressed plunger and jacket heating by means of hot water, an internal temperature of 120°-125° C. being achieved.

0.2 parts by weight of the kneaded material were stirred at 0°-5° C. into a mixture of 0.6 parts by volume of water and 0.2 parts by weight of ice, and the pH value was simultaneously maintained at 5.8-6.2 by the portionwise addition of a total of 0.07 parts by weight of sodium bicarbonate. The blue solution obtained was clarified and spray-dried. 0.185 parts by weight of a blue dyestuff powder, which was 54% strength of the dyestuff of the formula (A), was obtained.

EXAMPLE 8

41.2 g/min of the sodium salt (92% strength) of 4-(3'-hydroxyethylsulfonylphenylamino)-1-aminoanthraquinone-2-sulfonic acid were introduced by way of a metering worm and 11.6 ml/min of 100% strength sulfuric acid were introduced by means of a metering pump into a customary commercial continuously-operating kneader (for example the Buss-Ko Kneader, Type PR 46 of Buss A. G., Basle/Switzerland), which operated at 26 revs/min. The kneader was maintained at a temperature of 95°–100° C. by means of steam. The kneaded material produced had a density of 1.6–1.7 g/cm³.

A sample of 0.2 parts by weight of the kneaded material continuously produced was worked up as described in Example 2. 0.16 parts by weight of a dyestuff powder, which was 90% strength of the dyestuff of the formula (A), was obtained.

EXAMPLES 1a–8a

Results equally as good as in the preceding Examples were obtained using continuous kneaders for comparatively large throughputs (for example the "Buss-Ko-Kneter" of the P or K series of the firm Buss A. G., Basle/Switzerland) or two-shaft mixing and kneading extruders (for example, the "Continua"-kneading extruder of the firm Werner & Pfleiderer, Stuttgart-Feuerbach or apparatus having a main kneading shaft and a cleaning shaft, for example the "AP-Conti-Reaktor" of the firm H. List, Prattein/Switzerland).

EXAMPLE 9

(a) 3493 parts by weight of the sodium salt (90% strength) of 4-(3'-β-hydroxyethylsulfonylphenylamino)-1-aminoanthraquinone-2-sulfonic acid in the form of a dry powder were placed in a customary commercial dispersion kneader having a heating and cooling jacket. Then, with the machine running at a speed of the two arms of approximately 36 and approximately 28 revs/min, a mixture of 370 parts by weight of 65% strength oleum and 1060 parts by weight of 100% strength sulfuric acid were introduced over the course of one hour. The mixture was processed for a further 30 minutes in the kneader, then heated to 100° C. within 30 minutes by heating the jacket and held for one hour at 100° to 110° C. Subsequently, cooling to room temperature was effected by jacket cooling, and the kneader was emptied. 4900 parts by weight of a red-brown powder were obtained, which powder was 70% by weight of dyestuff of the above-mentioned general formula IIa in which $R_1$ and $R_2$ represented hydrogen.

(b) 41 parts by weight of the dyestuff powder obtained according to (a) were dissolved at a pH of 4.5–5.0 whilst sprinkling in 11 parts by weight of calcined soda in 240 parts of water and 60 parts by weight of ice at 10° to 20° C. The dyestuff solution obtained was clarified, then dried on a drying plate at 50°–60° C. in a circulating air chamber or a vacuum drying chamber. The dry material was ground. 45 parts by weight of a dark-blue dyestuff powder were obtained, which powder was 68% strength of the dyestuff of the formula (A). It is very well suited to dyeing and printing cellulose textiles by processes of application customary for reactive dyestuffs, and produces good dyeings and prints of very pure blue shades.

EXAMPLE 10

(a) 4020 parts by weight of 4-(3'-β-hydroxyethylsulfonylphenylamino)-1-aminoanthraquinone-2-sulfonic acid in the form of a dry powder were placed in a dispersion kneader having a heating and cooling jacket. Over a period of 30 minutes, with the machine running at a speed of approximately 36 revs/min for one kneading arm and approximately 28 revs/min for the other kneading arm, a mixture of 857 parts by weight of 65% strength oleum and 196 parts by weight of 100% strength sulfuric acid were introduced. The reaction mixture was kneaded for a further 30 minutes, and then the temperature was temporarily increased to 90°–100° C. by jacket heating. As soon as the powdery mixture had changed into large chunks there was a change over to jacket cooling with water, and the temperature during kneading was maintained at 90°–100° C. for a further 30 minutes. Subsequently the temperature was lowered to room temperature by jacket cooling and the kneader was emptied. The red-brown powder obtained was 92% strength of the dyestuff of the general formula IIa in which $R_1$ and $R_2$ represented hydrogen.

(b) 634 parts by weight of the red-brown dyestuff powder obtained according to (a) were dissolved at a pH of 4.5–5.0 in 3000 parts of water and 500 parts by weight of ice at 10°–20° C. whilst sprinkling in 160 parts by weight of calcined soda. The dyestuff solution obtained was clarified and dried on a drying plate at 50°–60° C. in a circulating air drying chamber (isolation of the ester is also possible by vacuum or spray drying). 730 parts by weight of a dark-blue powder were obtained, which powder was 85% strength of the dyestuff of the formula (A). The dyestuff can be applied to cotton by printing and dyeing methods customary for reactive dyestuffs.

(c) 63 parts by weight of the dyestuff powder obtained according to (a) and 16 parts by weight of calcined soda were ground well in a mixer. 79 parts by weight of a red-brown powder were obtained, which powder was 73% strength of the dyestuff of the general formula IIa in which $R_1$ and $R_2$ both represented hydrogen. It can be applied to cellulose textile materials by printing and dyeing methods customary in the art for reactive dyestuffs, and produces dyeings and prints of very pure blude shades.

EXAMPLE 11

127 kg/h of the sodium salt (89% strength) of 4-(3'-β-hydroxyethylsulfonylphenylamino)-1-aminoanthraquinone-2-sulfonic acid were metered by means of a conveyor-type weigher into the inlet housing of a two-shaft continuous kneading extruder, the worms of which had a diameter of 120 mm and an effective length of approximately 150 cm and had one four-part kneading block pair staggered in the same direction, and two four-part kneading block pairs staggered in the opposite direction, arranged between the transport elements, and processed with a speed of 80 revs/min. Simultaneously, 73 kg/h of 100% strength sulfuric acid were added by means of a metering pump shortly after the introduction of the powder material. The first housing was heated with hot water of a temperature of 80° C., and the following housing was cooled with water of a temperature of 8° C. The starting temperature of the kneading material was 115° C. The resulting kneaded material of a density 1.6–1.7 g/cm³ was in the form of pieces of a few centimeters in size and is suitable in this form for further processing in an aqueous phase optionally with neutralization. It the kneaded material is passed through a perforated plate and separated in the form of uniform cylinders by means of periodically operating cutters, a readily workable and easily transportable product is likewise obtained.

The test conditions can be varied widely using a two shaft continuous kneading extruder. Thus, for example, the number of revolutions can be substantially increased, for example up to 250 revs/min, or reduced to, for example, 50 revs/min, without substantially influencing the very high degree of esterification. Also, the effective length of the worm can be varied, or the fitting of the worms with regard to number and seating of transport elements and kneading blocks can be varied. Likewise, the amount of the sodium salt of 4-(3'-β-hydroxyethylsulfonylphenylamino)-1-aminoanthraquinone-2-sulfonic acid metered in can be altered quickly qnd easily to, for example, 95 kg/h of an 85.3% strength product and to 55 kg/h of 100% strength sulfuric acid.

The work up of the kneaded material obtained can be effected, for example, by introducing into water, neutralisation and subsequent spray drying, similarly to the preceding examples.

EXAMPLE 12

3320 parts by weight of 2-(3'-β-hydroxyethylsulfonylphenylazo)-1-hydroxynaphthalene-4-sulfonic acid (79% strength) in pulverulent form were placed in a customary commercial dispersion kneader (for example of the firm Werner & Pfleiderer), one kneading arm of which operated at a speed of 29 revs/min and the other at 21 revs/min. Subsequently 1470 parts by weight of 100% strength sulfuric acid were added dropwise in the course of 10 minutes. The composition was kneaded for 4 hours at 60°-85° C.

80 parts by weight of the kneaded material thus obtained were introduced into 1050 parts by volume of water and the pH value was adjusted to 4.5-4.8 at 5°-10° C. by the addition of sodium bicarbonate. The mixture was spray-dried. 86 parts by weight of a dyestuff powder were obtained, containing approximately 59% by weight of the disodium salt of 2-(3'-β-sulfatoethylsulfonylphenylazo)-1-hydroxy-naphthalene-4-sulfonic acid having a molecular weight of 528. The dyestuff thus obtained colors cellulose fibers in yellowish red nuances in accordance with dyeing processes customary for reactive dyestuffs.

EXAMPLE 13

3846 parts by weight of the monocopper complex compound of 2-[2'-(5''-β-hydroxyethylsulfonyl-2''-hydroxyphenylazo)-1'-hydroxynaphthalene-6'-azo]-(8-amino-1-hydroxynaphthalene)-3',5,7-trisulfonic acid (67% strength) in pulverulent form were placed in a dispersion kneader (for example of the firm Werner & Pfleiderer) the kneading arms of which operated at 29 and 21 revs/min. Subsequently 750 parts by weight of 100% strength sulfuric acid were added dropwise in the course of approximately 15 minutes and kneading was carried out for 7 hours at 70°-80° C.

The kneaded material thus obtained can be neutralised in water in a similar manner to that described in the preceding Examples; the dyestuff is isolated from this solution by evaporation. A dark blue powder, which colors cellulose fibers in marine blue shades, is obtained.

EXAMPLES 14-174

In an identical or analogous manner to that described in Examples 1-13, the dyestuffs given in the following Table can be produced equally well and with a high degree of esterification starting from their corresponding β-hydroxyethylsulfonyl compounds.

| Ex. No. | Formula of the dyestuff obtained | Ex. No. | Formula of the dyestuff obtained |
|---|---|---|---|
| 14 | [anthraquinone structure with NH2, SO3H, NH-naphthyl-SO2—CH2—CH2—OSO3H] | 15 | [anthraquinone structure with NH2, SO3H, NH-naphthyl-SO2—CH2—CH2—OSO3H] |
| 16 | [anthraquinone structure with NH2, SO3H, NH-naphthyl-SO3H, SO2—CH2—CH2—OSO3H] | 17 | [anthraquinone structure with NH2, SO3H, NH-(H3C, CH3, CH3)phenyl-SO2—CH2—CH2—OSO3H] |
| 18 | [anthraquinone structure with NH2, SO3H, NH-(H3C, CH3)phenyl-SO2—CH2—CH2—OSO3H] | 19 | [anthraquinone structure with NH2, SO3H, NH-(H3C, CH3)phenyl-SO2—CH2—CH2—OSO3H] |

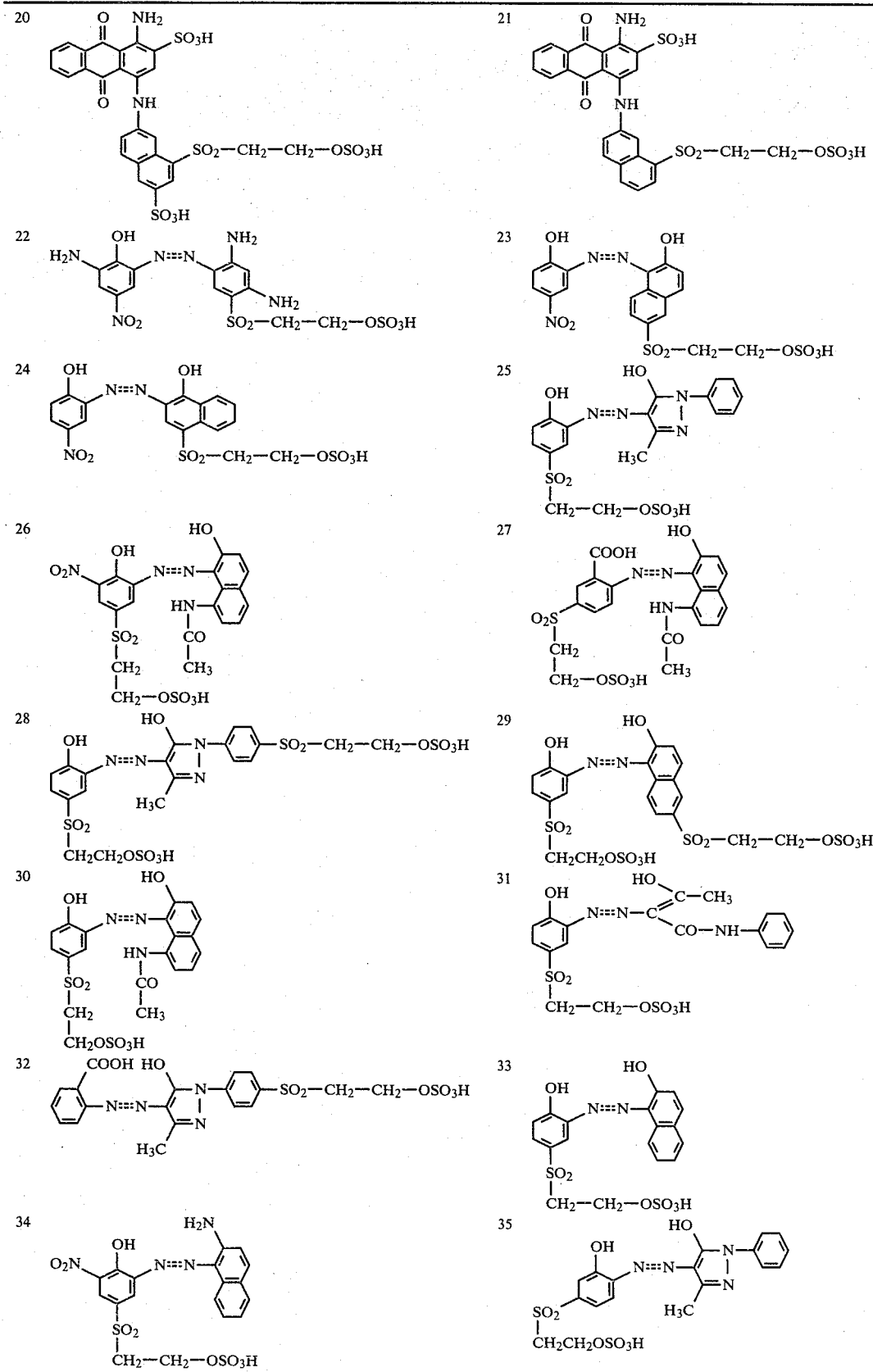

-continued
36 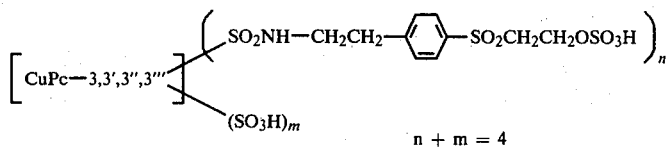
n + m = 4
37 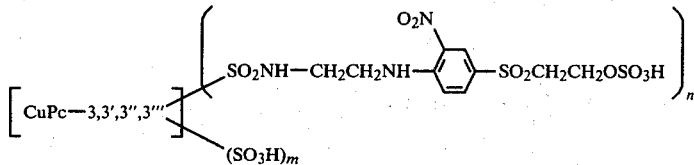
n + m = 4
38 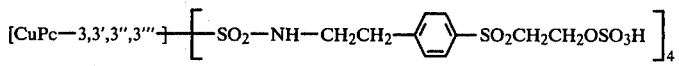
39 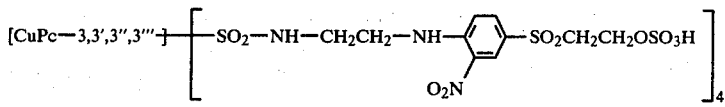
40 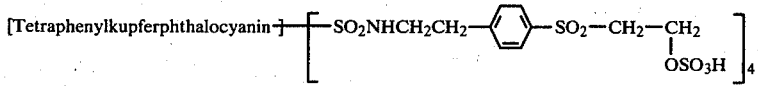
41 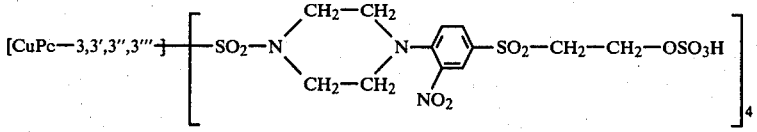
42 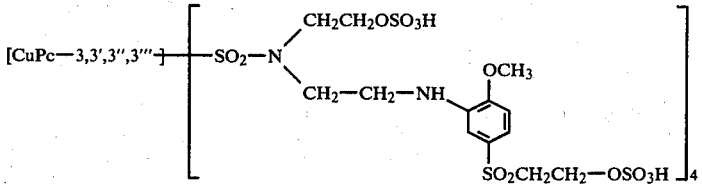
43 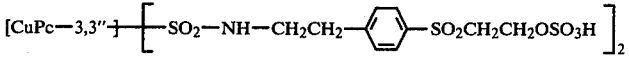
44 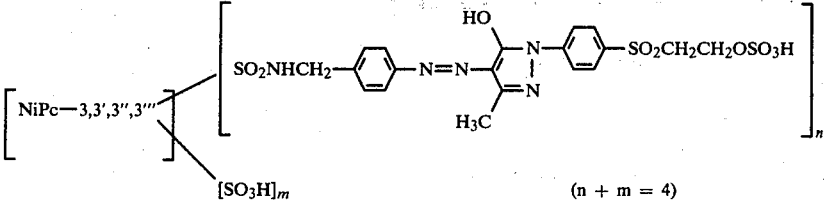
(n + m = 4)
45 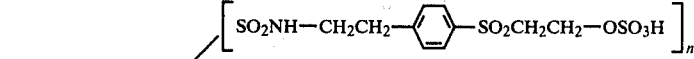
(n + m + p = 4)
46 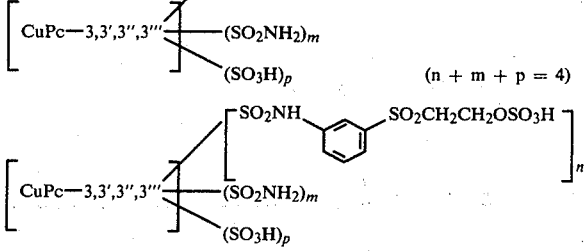
(n + m + p = 4)

-continued
47 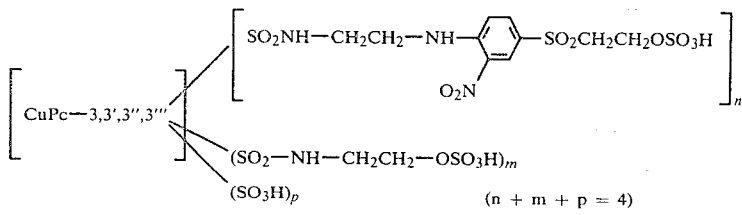
$(n + m + p = 4)$
48 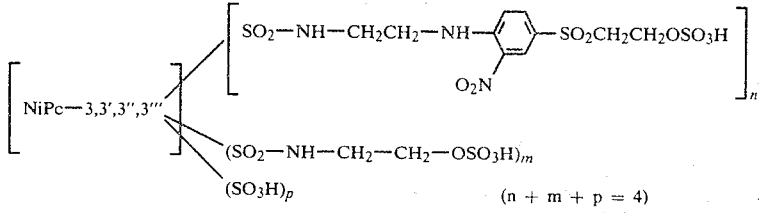
$(n + m + p = 4)$
49 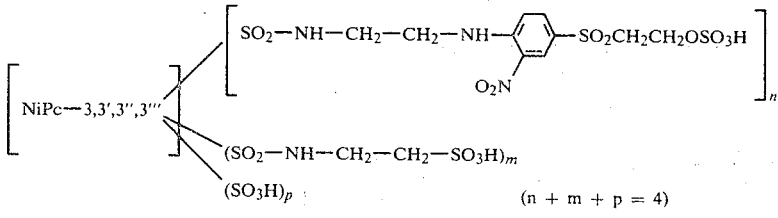
$(n + m + p = 4)$
50 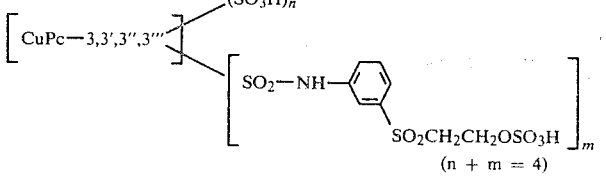
$(n + m = 4)$
51 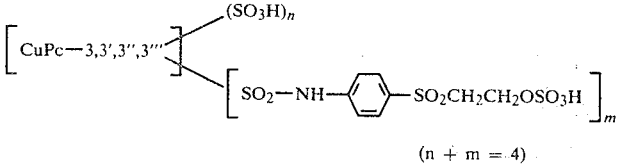
$(n + m = 4)$
52 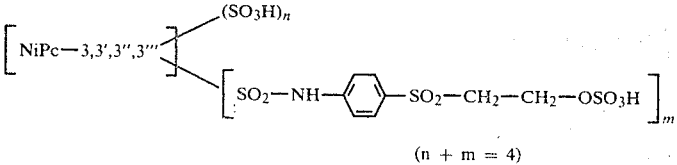
$(n + m = 4)$
53 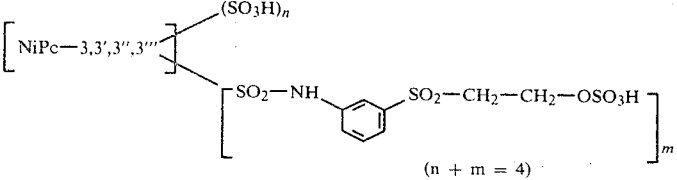
$(n + m = 4)$
54 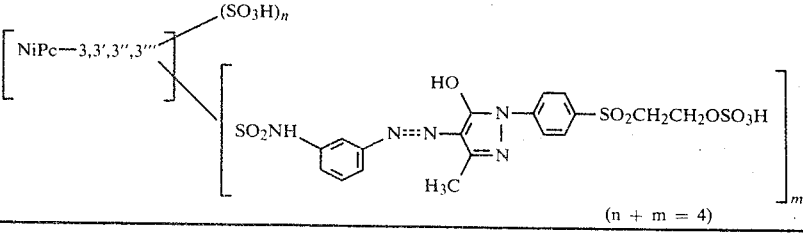
$(n + m = 4)$
| Ex. No. | Formula of the dyestuff obtained | Ex. No. | Formula of the dyestuff obtained |
|---|---|---|---|

-continued
| 55 | 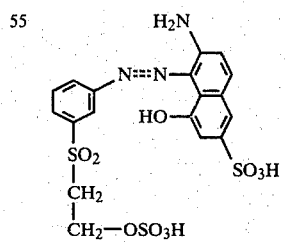 | 56 | 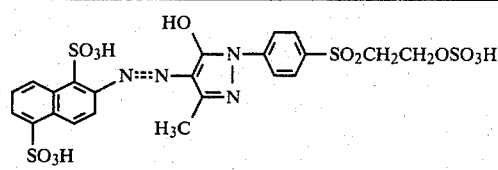 |
| Ex. No. | Formula of the dyestuff obtained |
|---|---|
| 57 | 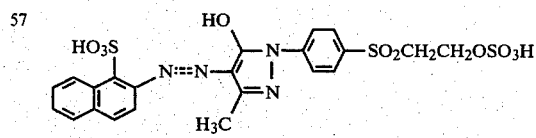 |
| 58 | 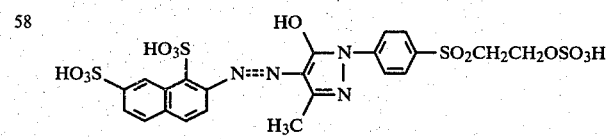 |
| 59 | 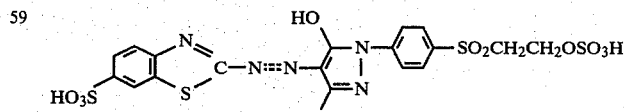 |
| 60 | 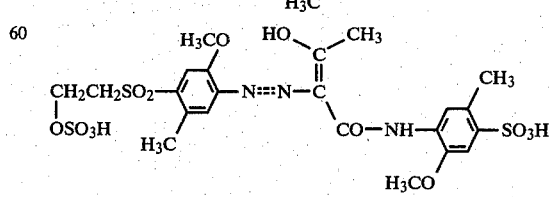 |
| 61 | 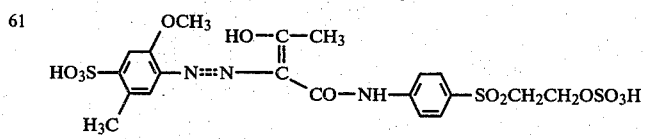 |
| 62 | 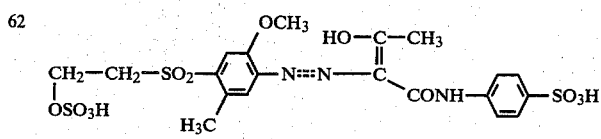 |
| 63 | 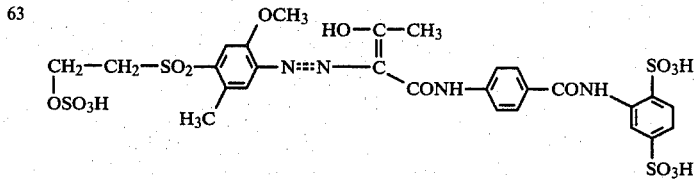 |
| 64 | 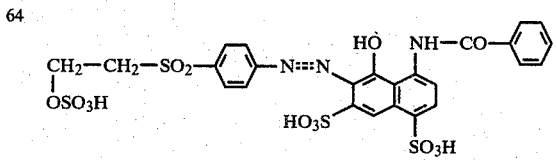 |
| 65 | 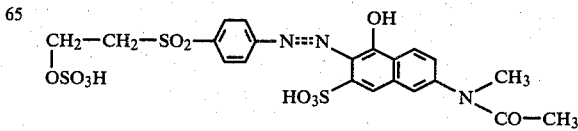 |
| Ex. No. | Formula of the dyestuff obtained | Ex. No. | Formula of the dyestuff obtained |

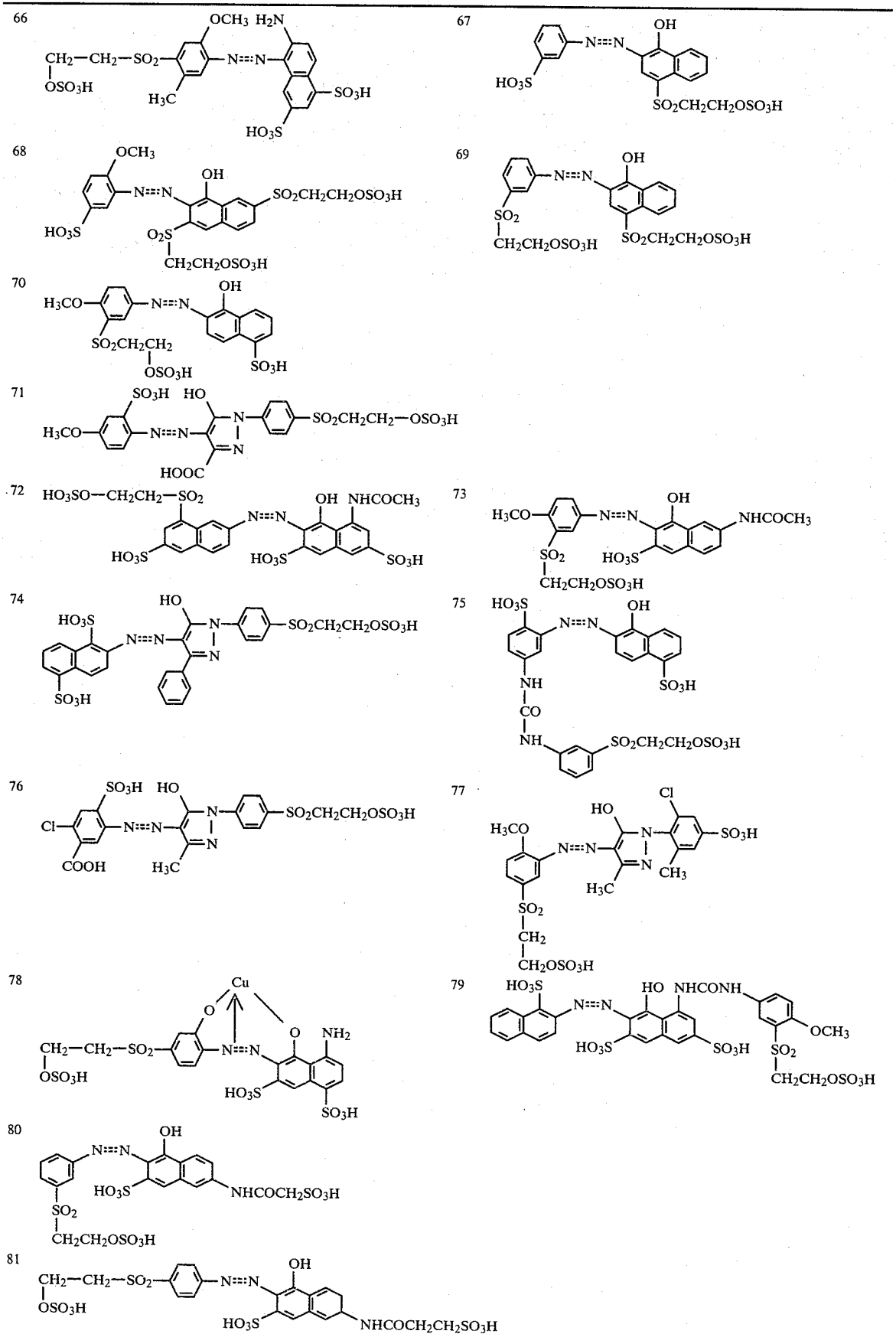

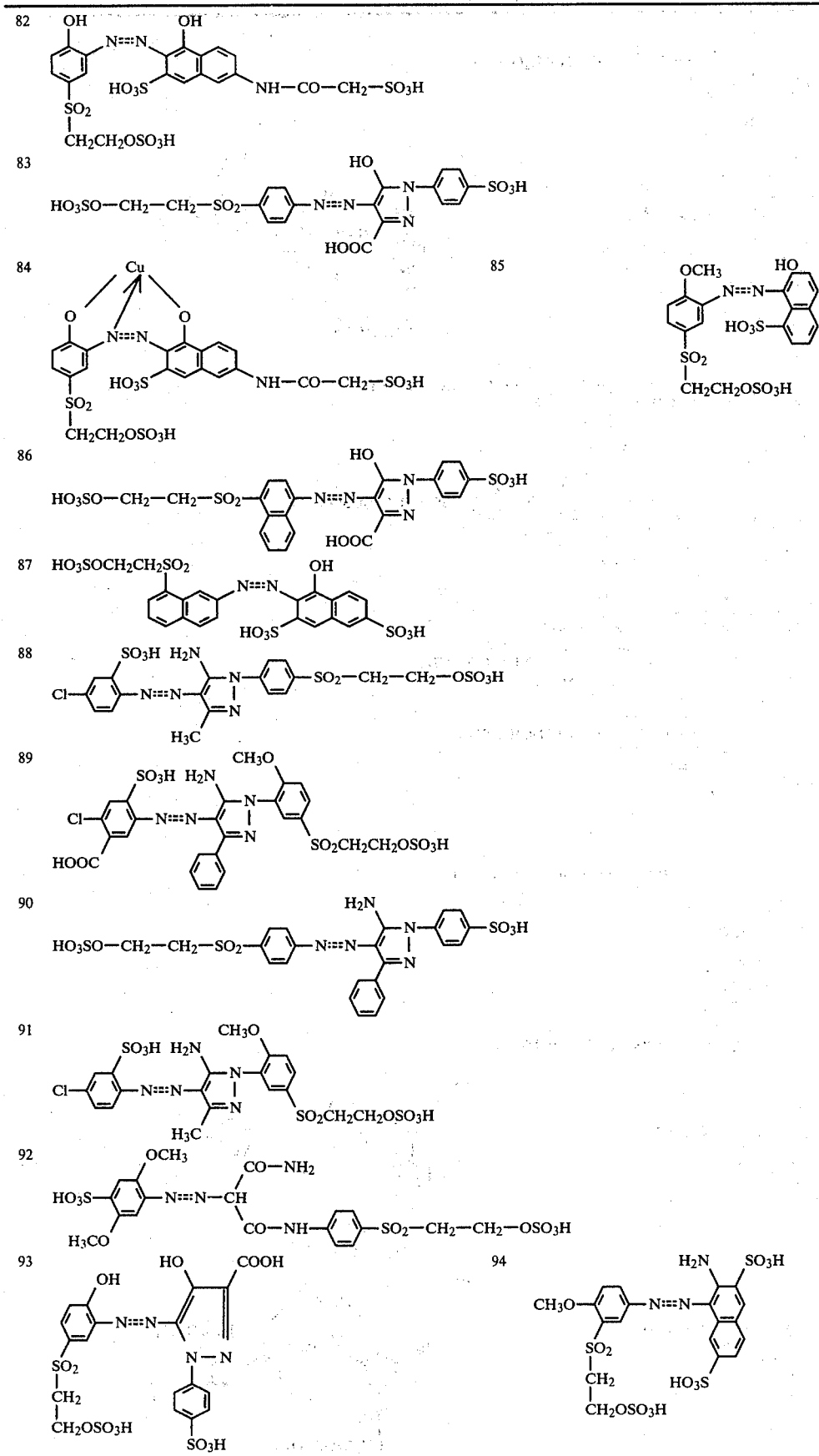

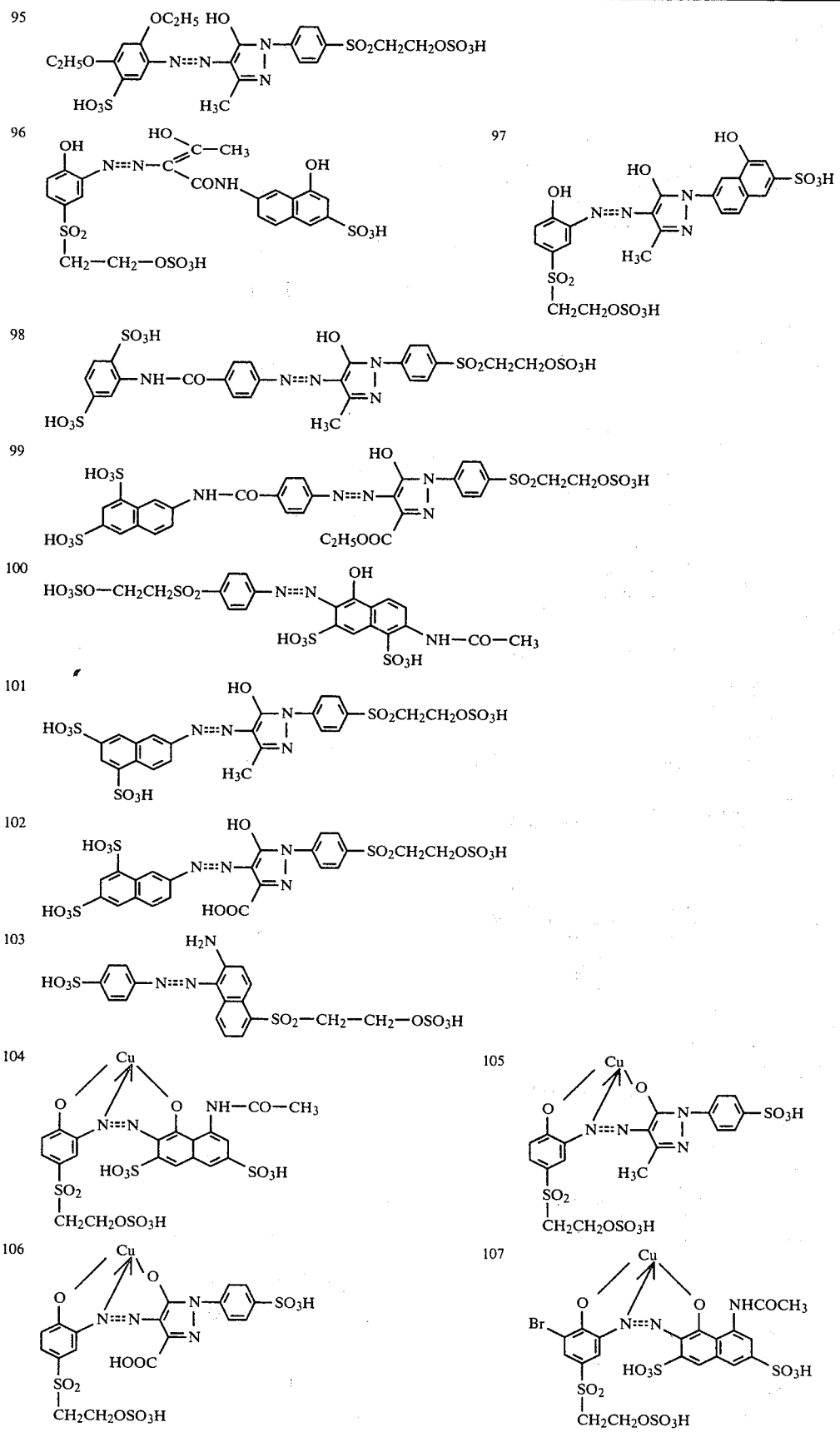

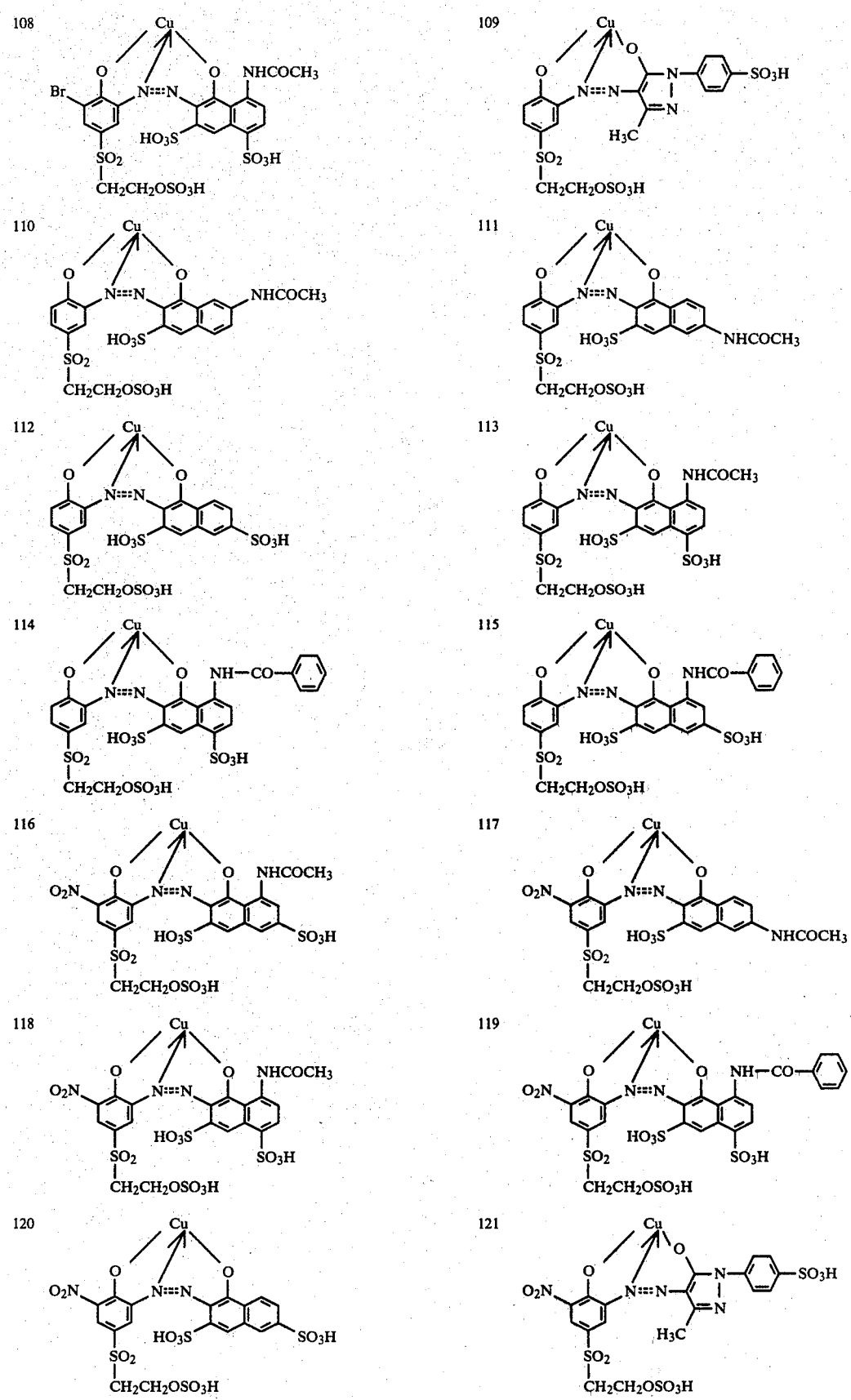

122 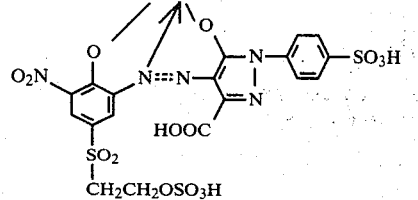
123 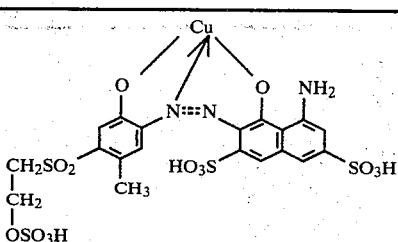
124 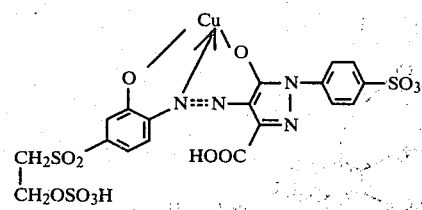
125 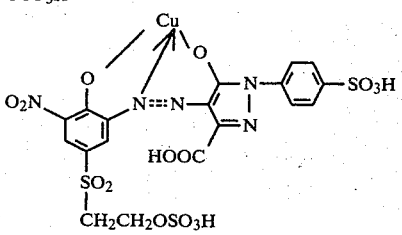
126 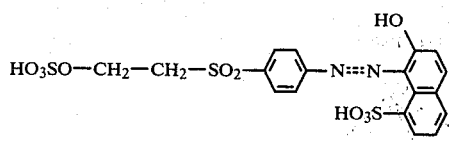
127 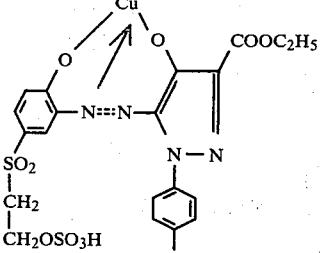
128 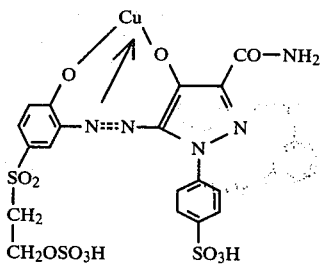
129 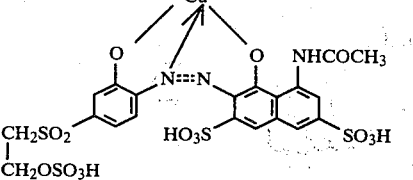
130 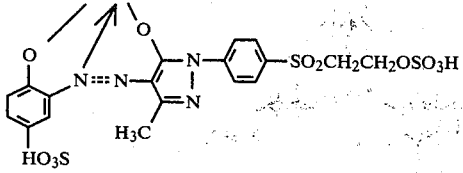
131 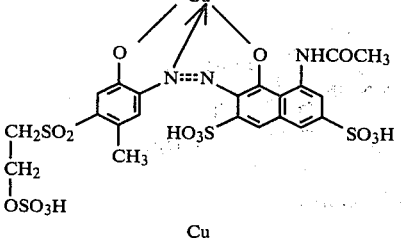
132 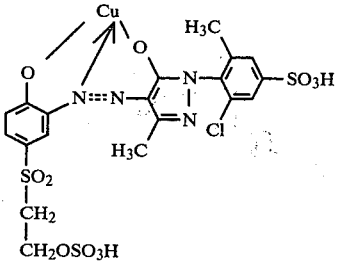
133 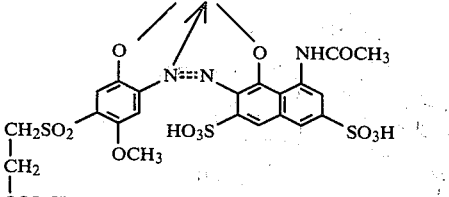
134 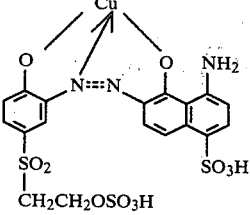

-continued
| Ex. No. | Formula of the dyestuff obtained |
|---|---|
| 135–144 | 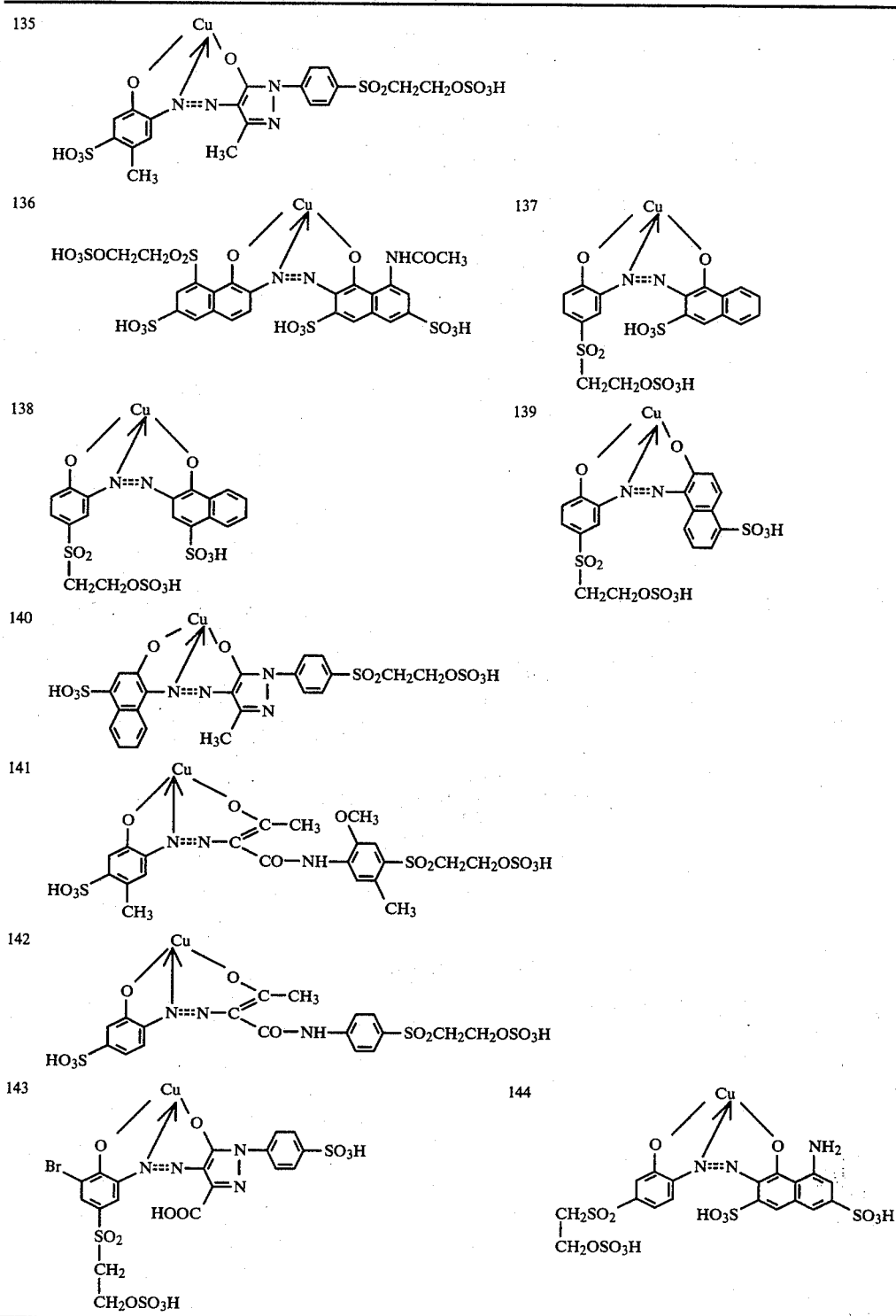 |
| 145 | 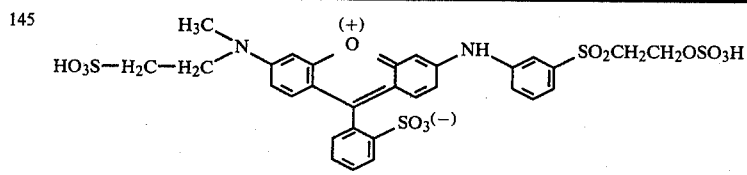 |

-continued
146 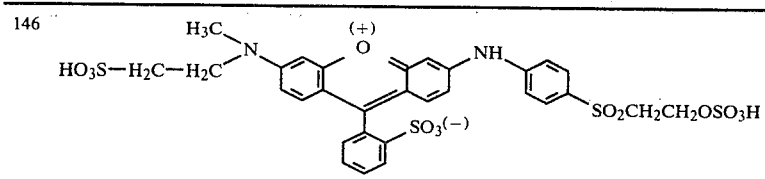
147 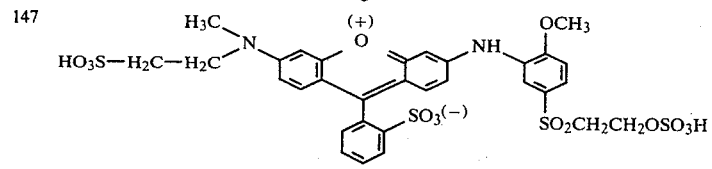
148 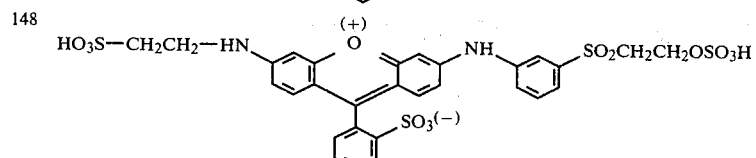
149 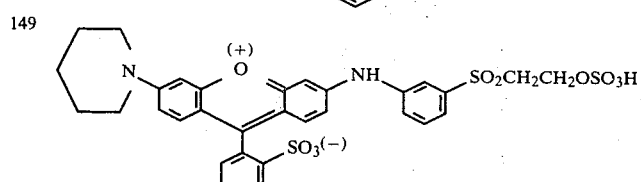
150 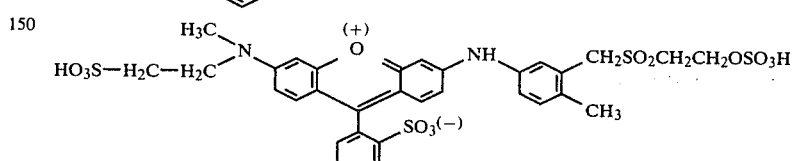
151 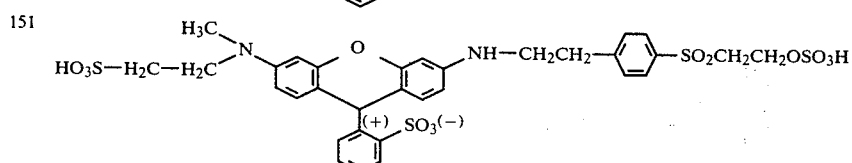
152 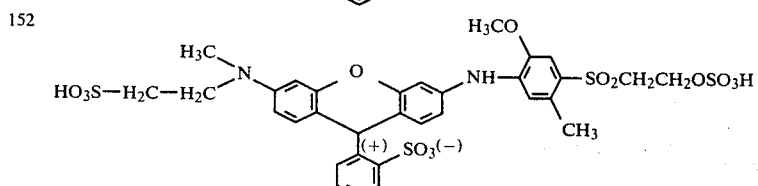
153 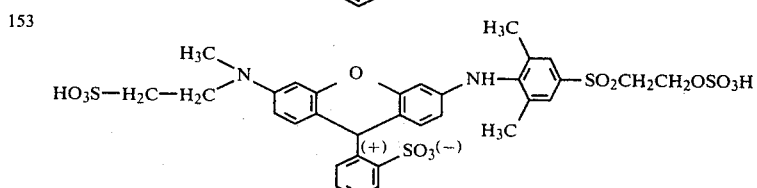
154 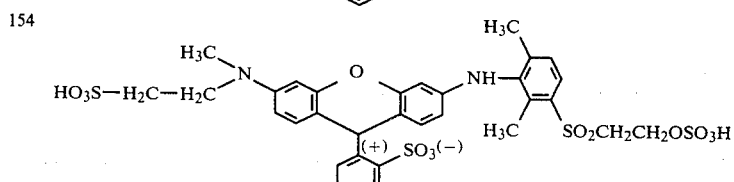
155 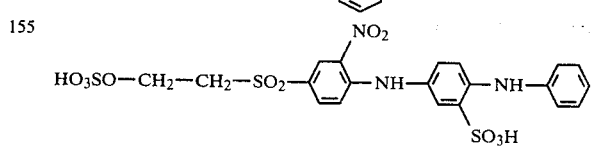

-continued
156
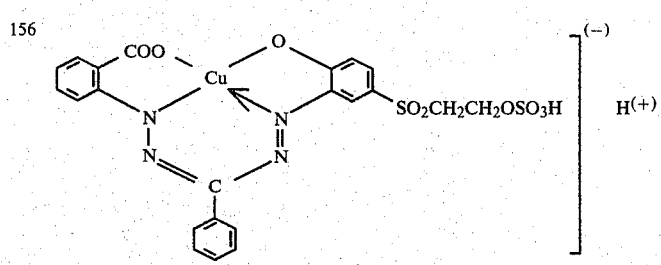
157
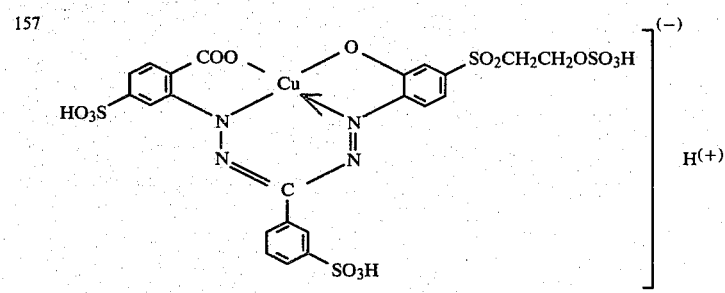
158
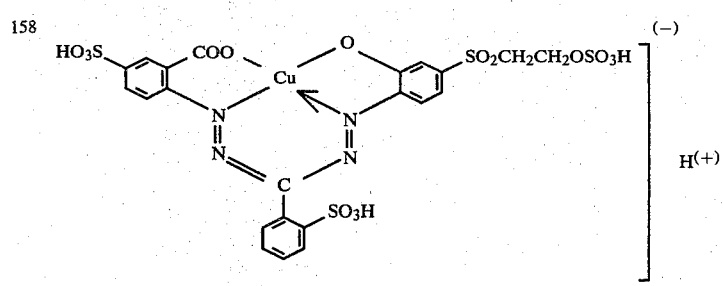
159
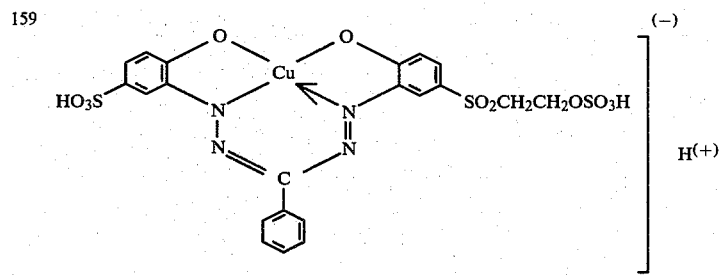
160
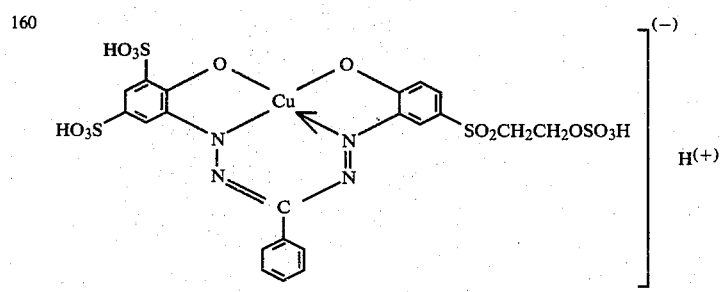
161
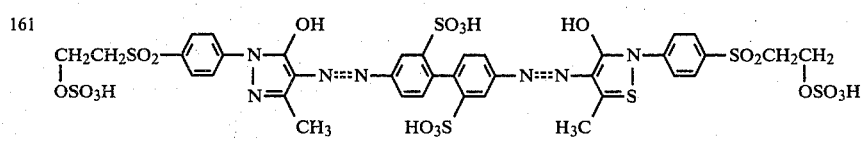

-continued
162 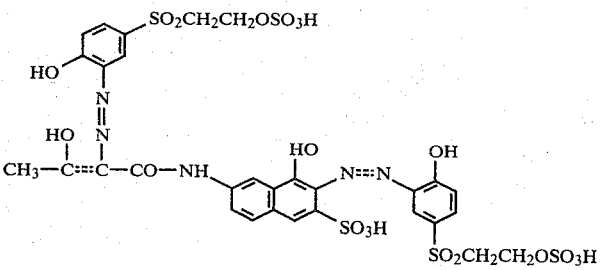
163 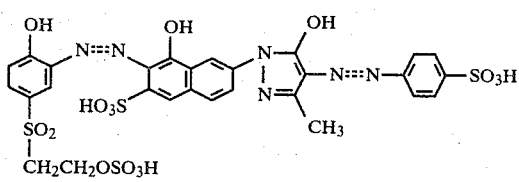
164 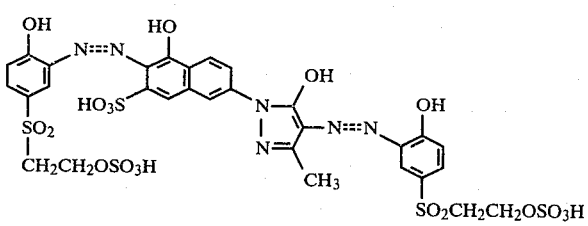
165 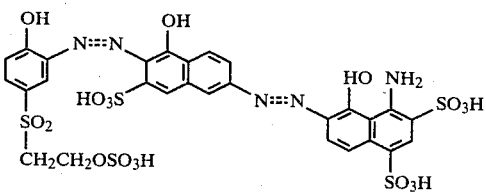
166 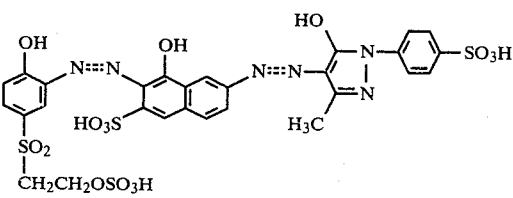
167 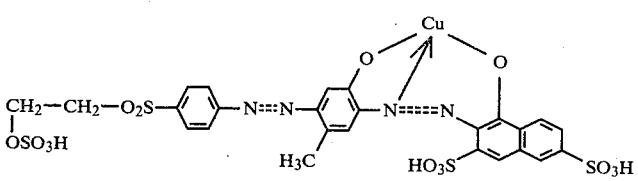
168 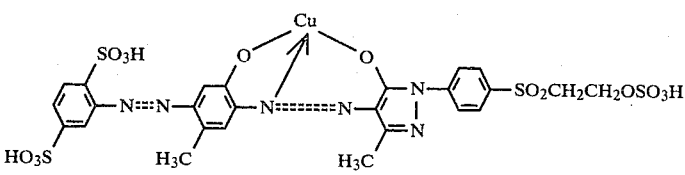
169 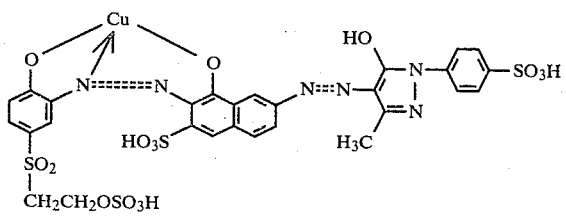

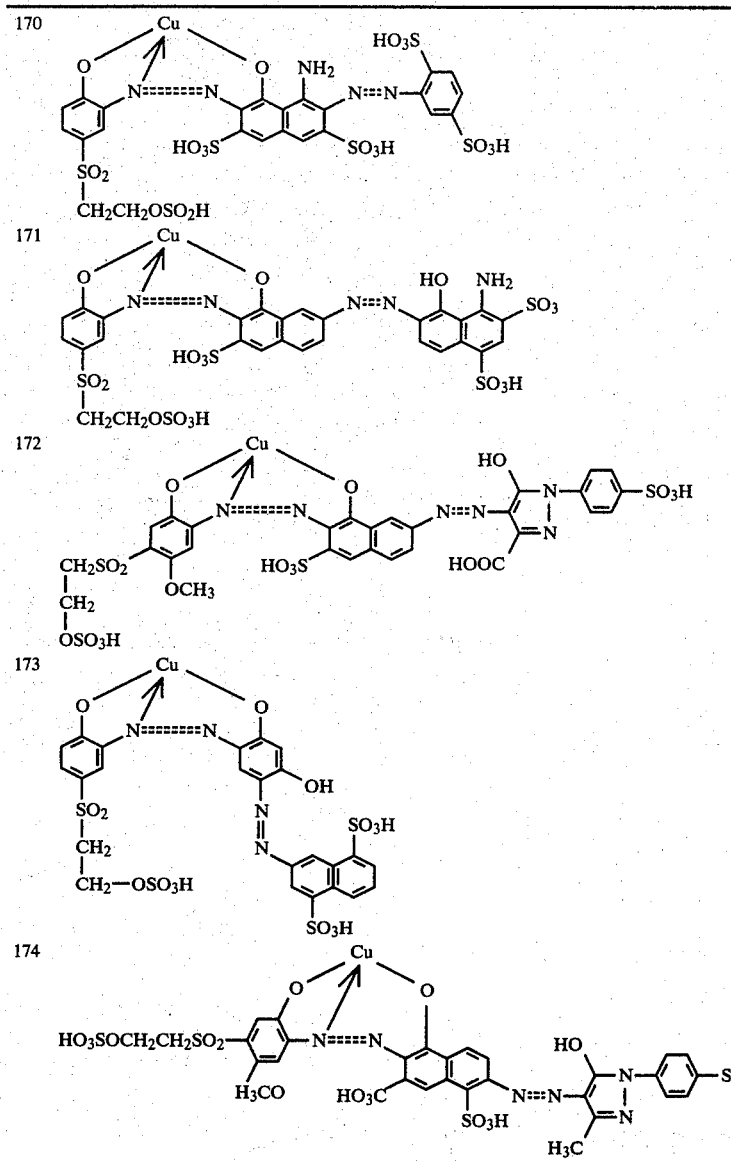

We claim:

1. In a process for the preparation of a compound of the formula

F—(SO₂—CH₂—CH₂—OSO₃H)ₙ in which F is the radical of an organic dyestuff molecule and n is the number 1, 2, 3 or 4, by esterification of a compound of the formula

F—(SO₂—CH₂—CH₂—OH)ₙ or a salt thereof in which F and n have the above meanings, by a sulfuric acid or sulfur trioxide agent, the improvement which comprises carrying out the reaction in a machine operating with a kneading action and with 1 to 5 times the equimolar amount, calculated on one mol of SO₃, of 92 to 100% strength sulfuric acid or sulfuric acid containing sulfur trioxide or sulfur trioxide itself.

2. A process according to claim 1, in which the reaction is carried out at a temperature of between 80° and 120° C.

3. A process according to claim 1, wherein 96–100% strength sulfuric acid, or sulfuric acid containing sulfur trioxide, is used as the esterification agent.

4. A process according to claim 1, wherein an aminoanthraquinone compound of the formula

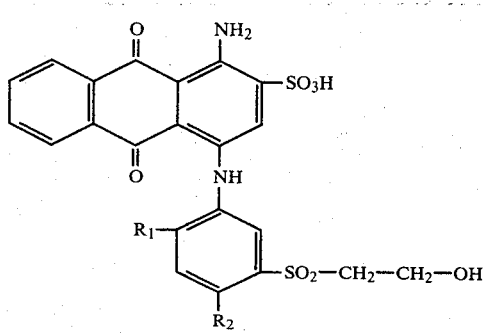

in which $R_1$ is hydrogen, lower alkoxy or carboxy and $R_2$ is hydrogen or lower alkoxy, with the proviso that at least one of the two substituents $R_1$ and $R_2$ is hydrogen, or a salt thereof is esterified to yield a compound of the formula

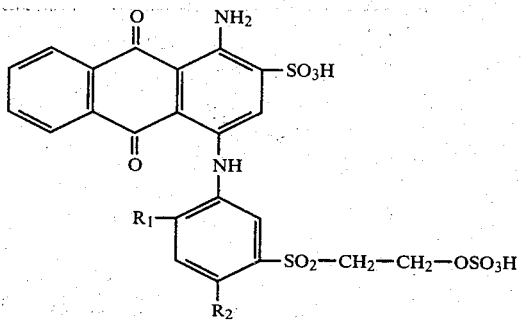

in which $R_1$ and $R_2$ have the above meanings.

5. A process according to claim 4, wherein $R_1$ and $R_2$ each is hydrogen.

6. A process according to claim 4, wherein $R_1$ is carboxy and $R_2$ is hydrogen.

7. A process according to claim 4, wherein $R_1$ is hydrogen and $R_2$ is methoxy.

* * * * *